(12) United States Patent
Pedersen et al.

(10) Patent No.: US 10,349,665 B2
(45) Date of Patent: Jul. 16, 2019

(54) PRODUCTION OF AN INSTANT COFFEE PRODUCT IN HIGH YIELD

(71) Applicant: GEA Process Engineering A/S, Søborg (DK)

(72) Inventors: Anders Holmen Pedersen, Copenhagen N (DK); Jakob Kryger Sørensen, Copenhagen K (DK); Henrik Haraldsted, Farum (DK)

(73) Assignee: GEA PROESS ENGINEERING A/S, Søborg (DK)

( * ) Notice: Subject to any disclaimer, the term of this patent is extended or adjusted under 35 U.S.C. 154(b) by 0 days.

(21) Appl. No.: 15/324,594

(22) PCT Filed: Jul. 8, 2014

(86) PCT No.: PCT/DK2014/050212
§ 371 (c)(1),
(2) Date: Jan. 6, 2017

(87) PCT Pub. No.: WO2016/004949
PCT Pub. Date: Jan. 14, 2016

(65) Prior Publication Data
US 2017/0202236 A1    Jul. 20, 2017

(51) Int. Cl.
*A23F 5/10* (2006.01)
*A23F 5/24* (2006.01)
*A23F 5/28* (2006.01)

(52) U.S. Cl.
CPC .............. *A23F 5/246* (2013.01); *A23F 5/28* (2013.01)

(58) Field of Classification Search
CPC ........ A23V 2250/21; A23V 2250/2108; A23F 5/243; A23F 5/40; A23F 5/486; A23F 5/26; A23F 5/262; A23F 5/246; A23F 5/14; A23F 5/02; A23F 5/505; A23F 5/04; A23F 5/465; A23F 5/267; A23F 3/163; A23F 5/163; A23F 3/426; A23F 5/36; A23F 3/405; A23F 3/42; A23F 3/18; A23F 5/48; A23F 5/18; A23F 5/185; A23F 5/265; A23F 5/46; A23F 5/16; A23F 5/38; A23F 5/28; A23F 5/285; A23F 5/32; A23F 3/30; A23F 5/10; A23F 5/42; A23F 3/14; A23F 3/32; A23F 5/226; A23F 5/44; A23F 5/00; A23F 5/046; A23F 5/50; A23F 3/36; A23F 5/06; A23F 5/08; A23F 5/166; A23F 5/24; A23F 5/34; A23F 5/483; A23F 3/385; A23F 5/12; A23F 5/20; A23F 5/206; A23F 5/223; A23F 5/405; A23L 27/28

See application file for complete search history.

(56) References Cited

U.S. PATENT DOCUMENTS

| | | | |
|---|---|---|---|
| 2,282,138 A * | 5/1942 | Kellogg | ............ A23F 5/26 426/432 |
| 2,408,260 A * | 9/1946 | Kellogg | ............ A23F 5/26 426/327 |
| 4,983,408 A | 1/1991 | Colton | |
| 5,714,183 A | 2/1998 | Nicolas et al. | |
| 8,603,562 B2 | 12/2013 | Gaonkar et al. | |
| 2007/0237857 A1* | 10/2007 | Silver | ............ A23F 5/246 426/45 |
| 2013/0177672 A1 | 7/2013 | Robinson et al. | |

FOREIGN PATENT DOCUMENTS

| | | |
|---|---|---|
| EP | 1745702 A1 | 1/2007 |
| EP | 1844661 A1 | 10/2007 |
| GB | 1200700 A | 7/1970 |
| SU | 1 597 151 A1 | 10/1990 |
| WO | WO 2013/019676 A2 | 2/2013 |

* cited by examiner

*Primary Examiner* — Hong T Yoo
(74) *Attorney, Agent, or Firm* — Condo Roccia Koptiw LLP

(57) ABSTRACT

Disclosed herein is a process for production of an instant coffee product in a high yield, comprising the steps of extracting roast and ground coffee beans with water having a temperature of 80° C. or less, to produce a first extract and spent coffee grounds, adding water to the spent coffee grounds to produce an aqueous suspension, hydrolysing the aqueous suspension using a hydrolysing enzyme to produce a second extract and spent remains, adding the first extract to the second extract, optionally after concentration and/or drying of the second extract, to obtain a combined extract, and drying the combined extract to obtain an instant coffee product. The high yield is obtained due to the reduction of enzyme inhibiting substances.

27 Claims, No Drawings

PRODUCTION OF AN INSTANT COFFEE PRODUCT IN HIGH YIELD

CROSS REFERENCE TO RELATED APPLICATIONS

This application is the National Stage Entry under 35 U.S.C. § 371 of Patent Cooperation Treaty Application No. PCT/DK2014/050212, filed 8 Jul. 2014 the contents of which are hereby incorporated by reference herein.

INTRODUCTION

The present invention relates to a process for production of an instant coffee product in a high yield and/or quality. The yield of total solids in the instant coffee product based on the amount of roasted and ground coffee bean solids may be 65% or more.

BACKGROUND ART

Approximately 700.000 tons of instant coffee is produced each year. The largest production cost is the price of the green coffee beans used. Thus, there is an incentive in reducing the consumption of green beans from today's typical value of approx. 2.4 kg green beans/kg of dry instant powder.

Typically, 2.4 kg green beans yield around 1.0 kg final product. The losses stem from roasting and extraction, where typically 0.4 kg is removed by roasting, and the extraction yields about 50% of the remainder. The level of yield corresponds to the sum of the naturally soluble components of typically approx. 30% plus an additional approx. 20% solubilised components recovered using advanced techniques. The state of the art yield found in the literature is 54-60%.

Traditional solubilisation is made by breakdown using wet, thermal hydrolysis at elevated temperatures. One advanced method for increasing the yield is to increase the wet hydrolysis temperature to 180° C. or above. While higher temperature will increase the amount of hydrolysis products, the high temperature will also contribute to the production of off-flavours, toxic substances, and degradation of solubilised components.

Hence, there has been a need for carrying out the solubilisation by lower temperature methods. Enzymatic breakdown of the various polymeric carbohydrates is an interesting possibility. Also the cost of the enzymes used and heat treatment has to be taken into account in the overall economic evaluation.

Advanced methods for increasing the yield and reducing process complications have been suggested in the prior art. Thus, GB 1.200.700 discloses the use of additional water-soluble coffee gum for maintaining oil and coffee flavouring constituents. The soluble dry coffee gum is preferably blended with the roasted coffee prior to grinding of the latter. During the blending and particularly during the grinding of the blend, the dry soluble gum particles serve as absorbents for oil and coffee flavouring constituents.

U.S. Pat. No. 8,603,562 relates to coffee-derived surfactants which are provided by alkaline catalysed transesterification reactions of sugars and coffee oil. The coffee-derived surfactants are especially useful in the production of coffee oil emulsions for use with, or incorporation into, coffee products. The coffee-derived surfactants increase the incorporation of coffee oil into the coffee products with reduced formation of so-called "coffee slicks". Incorporation of the coffee in the coffee product maintains some of the coffee flavour in the final product.

Enzymes have been used to increase the quality or the yield in a number of documents. Thus, U.S. Pat. No. 5,714,183 discloses a method for hydrolysing galactomannans in a liquid coffee extract to reduce or eliminate formation of a gel during freezing of the extract. The liquid coffee extract is produced by hydrolysing the extract with an immobilized beta-mannanase at a sufficient temperature and for a sufficient time to remove galactomannans from the extract and form a final product which is substantially free of beta-mannanase.

U.S. Pat. No. 4,983,408 discloses a method for producing an improved yield of coffee extract which comprises: (1) pre-treating an aqueous mixture of coffee grounds with steam in a closed vessel under pressure at a temperature in excess of 200° C.; (2) maintaining said temperature and pressure for a period of from about 1-10 minutes; (3) instantaneously exposing the contents of said vessel to the atmosphere without cooling so as to bring said contents to atmospheric levels; and (4) treating the slurry thus obtained with a member selected from the group consisting of a hydrolytic enzyme and a mixture of hydrolytic enzymes. The process produces thermal damage by-products and the yield is suboptimal.

Membrane based methods have been suggested in EP1844661, which discloses a method to produce a soluble coffee extract, said method comprising: (1) finely wet milling roasted coffee solids to form a coffee slurry containing coffee solids; (2) treating the coffee slurry with an effective amount of an enzyme in the form of a stabilized enzyme composition at a temperature and for a time sufficient to hydrolyse the coffee solids to form a soluble coffee extract material, wherein the stabilized enzyme composition comprises the enzyme and an effective amount of a coffee-derived material to stabilize the enzyme; and (3) separating the soluble coffee extract material into a retentate and a permeate, wherein the permeate comprises the soluble coffee extract.

EP 1.745.702 also relates to a membrane based method, wherein a coffee extract is produced by finely wet-milling coffee beans or ground coffee or pre-extracted coffee grounds with hydrolase enzymes, preferably carbohydrase or protease enzymes, e.g. glucanases and mannanases, or mixtures thereof, the mixtures preferably comprising mannanase, cellulase and protease enzymes, and wherein the enzymes are retained in the reaction zone, via the use of a membrane device, so that the finished extract is essentially devoid of enzyme, oil or particulates and the enzyme(s) can eventually be re-used. The process results in a reaction zone in which only a small amount of 5-hydroxymethyl furfural (5-HMF) is present, because 5-HMF penetrates the membrane and thus does not inhibit the enzyme activity.

In EP 1,745,702 it is realized that 5-HMF may impart an undesirable winey or hay-like taste (page 229 of Coffee Flavour Chemistry, Ivon Flament, Wiley 2002). The present inventors have discovered that 5-HMF and other thermal decomposition products also seriously inhibit the activity of many enzymes. However, the suggestion of using a membrane-based process adds to the complexity of the over-all process and to the investment needed in the process. The present invention suggests a process design which avoids or reduces the presence of 5-hydroxymethyl furfural (5-HMF) and other undesired decomposition products during the action of the hydrolysing enzymes, thereby improving the reaction conditions for the enzymes.

Short Description of the Invention

The present invention relates to a process for production of an instant coffee product in a high yield, comprising the steps of
a) Extracting roast and ground coffee beans with water having a temperature of 80° C. or less, to produce a first extract and spent coffee grounds,
b) Adding water to the spent coffee grounds to produce an aqueous suspension
c) Hydrolysing the aqueous suspension using a hydrolysing enzyme to produce a second extract and spent remains,
d) Adding the first extract to the second extract, optionally after concentration and/or drying of the second extract, to obtain a combined extract, and
e) Drying the combined extract to obtain an instant coffee product.

The initial extraction process for the roast and ground coffee beans is performed at a low temperature, i.e. below 80° C. The low temperature results in a reduced production of 5-HMF and other decomposition products and less damage to aroma compounds. In the subsequent hydrolysing step the hydrolysing enzymes are not substantially inhibited by 5-HMT and other decomposition products, which results in a higher yield of the second extract. Furthermore, volatile aroma components and aroma components decomposed at higher temperatures are retained in the first extract. While the first extraction may be performed at any temperature below 80° C. as long as the extract is liquid, generally the extraction step a) is performed at a temperature in the range of 10-80° C. Preferably, the first extraction is performed at 15° C. to 45° C., most preferred at room temperature, to prevent that the temperature of the water contributes to the production of decomposition products.

The time used for extracting the soluble components in the first extract process varies with the temperature of the water, milled particle size, concentration gradient and water-particle contact. Generally, the extraction time is longer for cool water than for hot water. In an aspect of the invention, the extraction step a) is performed in a time range of 5 min to 2 hours.

The hydrolysing enzymes used are able to decompose one or more of the various chemical constituents of the spent coffee grounds, such as carbohydrates, e.g. cellulose, hemicellulose, and starch; lignin; proteins; lipids; nucleic acids; etc. The decomposition products are preferably soluble in water. According to a preferred aspect, the hydrolysing enzyme is selected among carbohydrate hydrolysing enzymes or carboxylic ester hydrolysing enzymes or any combination of such enzymes.

The conditions for the enzymatic hydrolysis reaction may vary depending on the type and activity of enzyme used, the temperature of the reaction media, the pH etc. In a preferred embodiment, the hydrolysis step c) is performed on an aqueous suspension of spent coffee grounds at a temperature in the range of 40-80° C., at pH 4-7, in a time range of 1-16 hours.

To assist the enzymatic reaction it may be suitable that an auxiliary agent is present during the hydrolysis step c). Examples of auxiliary agents include acidity controllers, surfactants, chelators, co-factors, etc. In a certain aspect of the invention the auxiliary agent is a surfactant. A surfactant improves the yield significantly, and it might even be derived from coffee.

A coffee-derived surfactant may be produced by chemical means, such as disclosed in U.S. Pat. No. 8,603,562, the technical content being incorporated herein by reference. In a preferred aspect, the coffee-derived surfactant is obtainable by
i. digesting spent coffee grounds with a carbohydrate hydrolysing enzyme to obtain carbohydrate fragments, and
ii. adding to the carbohydrate fragments a coffee oil and a carboxylic ester hydrolysing enzyme at conditions allowing for transesterification.

The carbohydrate hydrolysing enzyme may be chosen from a large group of commercially available enzymes. In an embodiment of the invention the carbohydrate hydrolysing enzyme is selected from the group comprising cellulase, xylanase, hemicellulase, or any combination of these enzymes.

Similarly, the carboxylic ester hydrolysing enzyme may be chosen from a large group of commercially available enzymes. In an embodiment of the invention the carboxylic ester hydrolysing enzyme is selected from esterase, lipase, or any combination thereof.

The coffee oil used for the preparation of the coffee-derived surfactant may be inherently present in the ground coffee beans or the coffee oil may be added. If added, the coffee oil is derived from green coffee beans, roast and ground coffee, or spent coffee grounds extracts.

While the coffee-derived surfactant may be produced separately, it is also possible in a certain embodiment of the invention that the coffee-derived surfactant is obtained in-situ during the hydrolysing step by the addition of a carboxylic ester hydrolysing enzyme and optionally a coffee oil to the aqueous suspension. The carboxylic ester hydrolysing enzyme will perform a transesterification in which lipophilic groups from the coffee oil is added to carbohydrate components.

After the first but before the second extraction the spent coffee grounds may be pre-treated prior to the enzymatic hydrolysis. The pre-treatment may be performed to make it easier for the enzymes to access their substrate. The pre-treatment may involve exposure of the interior of the plant cells and/or loosening of the lignin from the cellulose. In a preferred embodiment, the pre-treatment involves
addition of water to the spent coffee grounds,
steam exploding the spent coffee grounds, and
separating in an intermediate extract and pretreated spent coffee grounds.

The intermediate extract from the steam explosion procedure may be used in the final product, purified, or may be discharged or used for another application if it contains too many off-flavours. Generally, however, the steam explosion procedure is controlled so that the intermediate extract, either as is, concentrated and/or dried, is added to the combined extract.

If only a "mild" temperature steam explosion is performed the amount of off-flavours are generally low and acceptable. Therefore, the intermediate extract can be added to the combined extract. Preferred conditions for the steam explosion involves that the steam explosion is performed in the temperature range of 50-170° C., at a pressure of 0.1 to 10 bars for 0.1 to 5 hours.

Alternative methods to steam explosion may involve freezing or homogenisation.

To loosen up the structure of the lignocellulose and to partially break down the structure of the hemicellulose it may be advantageous to use a certain temperature regime for the pre-treatment. The temperature regime may comprise in any order A low temperature treatment period in the temperature range of 25 to 150° C. for 1 min to 24 hours, and A high temperature treatment period in the temperature range of 100 to 200° C. for 1 min to 24 hours.

The steam explosion may be performed separately or may be integrated in the temperature regimen. In a preferred aspect of the invention, the steam explosion is performed during the high temperature treatment period.

In between the steam explosion and enzymatic treatment steps, washing procedures are beneficial since they will increase the efficiency of the enzymes. Such procedures remove the enzyme inhibitors and enhance the process. The washing water may be included in the combined extract.

After the enzymatic hydrolysis, the second extract may be post-treated either by Heating to a temperature above 70° C. in a time sufficient to inactivate the enzyme, typically 120° C. for 10-30 min, and possibly remove coagulated enzymes or Membrane filtering to remove the enzyme, which optionally is re-used in step (c).

The roast and ground coffee beans used in step (a) may be finely divided to a suitable size typically between 0.2-5 mm. In the subsequent enzymatic hydrolysis step (c) the spent coffee grounds may be further divided into smaller particles to ease the access for the enzymes. In a preferred aspect the spent coffee grounds are finely divided into an average particle size in the range of 2-1000 μm, preferably to 30-500 μm prior to the enzyme treatment.

Prior to step (a), coffee oil may be removed from the coffee beans by pressing or other means. Removing oil may have a positive effect on the enzymatic hydrolysis. This coffee oil may be used for several purposes afterwards, e.g. it may be added to the extract or final product, or it may be used for the production of a coffee derived surfactant.

The invention affords a high yield by the production of first, intermediate, and second extracts. In a preferred aspect, the yield of total solids in the instant coffee product, based on the amount of roasted and grounded coffee beans, is 65%, 70%, or 75% by weight or more.

The combined extracts or one or more of the first, intermediate, and second extract may be concentrated by membrane filtration prior to subsequent spray drying or freeze drying. In an aspect of the invention the extract is membrane filtered for recycling aqueous permeate, which may be slightly acid, for reuse in the process. As the first extract contains volatile aroma components it is generally desired that the first extract is concentrated in an aroma preserving way, such as freeze concentration.

DETAILED DESCRIPTION

An important component of the present invention is the use of one or more enzymes. Types of enzymes which may be employed include, but are not limited to, amylase, mannanase, hemicellulase, glucanase, cellulase, esterase, protease, cellobiase, arabinase, galactanase, arabino-galactanase, nuclease, pectinase, isomerase, ligninase, pectinase and lipase. These enzymes can be employed individually or in combination in relatively small doses of 0.01-2.0% of enzyme concentrate relative to the substrate constituent in a given amount of water.

Specific examples of carbohydrate hydrolysing enzymes include β-glucosidase, β-galactosidase, 6-phospho-β-glucosidase, 6-phospho-β-galactosidase, β-mannosidase, β-D-fucosidase, β-glucuronidase, exo-β-glucosaminidases, mannosylglycoprotein endo-β-mannosidase, β-D-glucosidase, α-L-arabinofuranosidase, β-D-xylopyranosidase, N-acetyl-β-D-glucosaminidases, β-D-glucan glucohydrolase, β-N-acetylglucosaminidase, α-glucosidase, α-galactosidase, α-glucuronidase, 6-phospho-α-glucosidase, 6-phospho-β-glucosidase, endo-glucanase, endo-mannanase, exo-glucanase, exo-mannanase, 1,6-galactanase, 1,3-mannanase, 1,4-xylanase, endo-glycoceramidase, xyloglucanase, cellobiohydrolase, endo-1,4-δ-glucanase, chitosanase, endo-1,3-1,4-δ-glucanase, licheninase, endo-1,4-δ-xylanase, exo-oligoxylanase, endo-δ-1,3-xylanase, endo-glycanase, endo-δ-1,4-xylanase, α-amylase, transglycosidases, oligo-1,6-glucosidase, pullulanase, cyclomaltodextrinase, maltotetraose-forming α-amylase, isoamylase, dextran glucosidase, trehalose-6-phosphate hydrolase, maltohexaose-forming α-amylase, maltotriose-forming α-amylase, maltogenic amylase, neopullulanase, malto-oligosyltrehalose trehalohydrolase, limit dextrinase, maltopentaose-forming α-amylase, amylosucrase, sucrose phosphorylase, cyclomaltodextrin glucanotransferase, 4-α-glucanotransferase, isomaltulose synthase, trehalose synthase, amyloglucosidase, glucodextranase, α,α-trehalase, endo-transglycosylase, xyloglucosyltransferases, keratan-sulfate endo-1, 4-β-galactosidase, endo-1,3-β-galactanases, endo-1,3-β-glucanase, endo-1,3(4)-β-glucanase, exo-1,3(4)-β-glucanase, lichenase, β-agarase, β-porphyranase, κ-carrageenase, 1,3-β-D-glucan endohydrolase, 1,3;1,4-β-D-glucan endohydrolase, 1,3-β-D-glucan exohydrolase, chitinase, endo-β-N-acetylglucosaminidase, exo-β-N-acetylglucosaminidase, β-N-acetylgalactosamindase, β-6-SO3-N-acetylglucosaminidase, exo-lacto-N-biosidase, muramidase, peptidoglycan N-acetylmuramoylhydrolase, 1,4-β-N-acetylmuramidase, N-acetylmuramoylhydrolase, β-1,4-N-acetylmuramidase, β-1,4-N,6-O-diacetylmuramidase, endo-β-1,4-mannanase, exo-β-mannanase, β-1,3:1,4-glucanase, β-1,3-xylanase, α-galactosidase, α-N-acetylgalactosaminidase, isomaltodextranase, polygalacturonase, pectinase, rhamnohydrolase, rhamnogalacturonan galacturonohydrolase, exo-α-fucosidase, glucuronoxylan xylanohydrolase, α-xylosidase, isomaltosyltransferase, maltaseamylase, glucoamylase, exo-inulinase, levanase, β-2,6-fructan 6-levanbiohydrolase, fructan β-(2,1)-fructosidase, fructan β-1-exohydrolase, fructan β-(2,6)-fructosidase, fructan β-6-exohydrolase, sucrose 1-fructosyltransferase, fructan 1-fructosyltransferase, fructan 6-fructosyltransferase, fructan 6G-fructosyltransferase, levan fructosyltransferase, exo-β-glucosaminidase, α-N-acetylgalactosaminidase, α-mannosidase II, β-xylosidase, α-L-iduronidase, α-L-arabinosidase, β-D-fucosidase, α-L-arabinofuranosidase, endo-α-L-arabinanase, exo-α-1,3-galactanase, β-D-xylosidase, arabinoxylan α-L-arabinofuranohydrolase, arabinoxylan arabinofuranohydrolase-D3, exo-α-1,5-L-arabinanase, endo-β-1,4-chitosanase, exo-α-1,2-mannosidase, ER-α-mannosidase I, aryl α-D-mannosidase, dextranase, dextran 1,6-α-isomaltotriosidase, isopullulanase, exo-β-agarase, β-1,4-galactanase, β-xylosidase, β-1,3-glucanase, exo-glucan-1,3-β-glucosidase, amylopullulanase, 4-α-glucanotransferase, endo-N-acetylneuraminidase, exo-α-glucosidases, mannosyl-oligosaccharide glucosidase, maltose (Glc-α-1,4-Glc) phosphorylase, trehalose (Glc-α1,α1-Glc) phosphorylase, kojibiose (Glc-α-1,2-Glc) phosphorylase, trehalose 6-phosphate (Glc-α1,α1-Glc6P) phosphorylase, endo-dextranase, cycloisomaltooligosaccharide glucanotransferase, α-glucuronidase, β-xylosidases, levansucrase, β-fructofuranosidase, inulosucrase, glucansucrase, dextransucrase, alternansucrase, mutansucrase, reuteransucrase, xyloglucanobiohydrolase, oligoxyloglucan cellobiohydrolase, xyloglucan endo-β-1,4-glucanase, xyloglucan hydrolase, β-glucuronidase, β-4-O-methyl-glucuronidase, baicalin β-glucuronidase, heparanase, hyaluronidase, endo-β-1,4-chitosanase, ι-carrageenanase, β-N-acetylhyaluronidase, endo-β-N-acetylglucosaminidase, β-agarase, α-N-acetylglucosaminidase, exo-α-mannosidase, α-1,2-mannosidase, α-1,3-mannosidase, α-1,4-mannosidase, α-1,6-mannosidase, α-L-arabinofuranosidase, cellobiose (Glc-β1,4-Glc) phosphorylase, cellodextrin ((Glc-β1,4-)n-1Glc; n≥3) phosphorylase, N,N'-diacetyl chitobiose (GlcNAc-β1,4-GlcNAc) phosphorylase, 1,2-α-L-fucosidase, endo-β-galactosidase, endo-α-mannosidase, exo-glucosidase I, exo-glucosidase II, lytic transglycosylase B, peptidoglycan lyase, α-1,3-galactosidase, β-galactoside phosphorylase, β-1,3-D-galactosyl-D-hexososamine phosphorylase, β-1,4-D-galactosyl-L-rhamnose phosphorylase, galacto-N-biose phosphorylase, lacto-N-biose I phosphorylase, galacto-N-biose I phosphorylase, lacto-N-biose I phosphorylase, α-glucuronidase, (4-O-methyl)-α-glucuronidase, acid β-glucosidase, glucocerebrosidase, α-1,3-L-(3,6-anhydro)-galactosidase, β-L-arabinobiosidases, β-L-arabinofuranosidase, endo-β-1,4-glucanase, methyl 6-O-(α-D-mannopyranosyl)-β-D-mannopyranosidase, methyl β-L-arabinofuranosidase, endo-α-N-acetylgalactosaminidase, exo-α-N-acetylgalactosaminidase, exo-β-1,3-glucanase, exo-1,6-glucanase.

Specific examples of carboxylic ester hydrolysing enzymes include acetylesterase, acyltransferase, glycolipase, triacylglycerol lipase of *Aspergillus Niger*, triacylglycerol lipase of *Candida Antarctica*, triacylglycerol lipase of yeast, triacylglycerol lipase of *Trichoderma Longibrachiatum*, sterol esterase, acylglycerol lipase, wax-ester hydrolase, and monoterpene epsilon-lactone hydrolase.

In some embodiments of the present invention steam explosion is used to increase the access to the plant constituents for the enzymes. Steam explosion involves placing spent ground coffee in a pressure vessel and contacting the contents with steam at elevated temperatures and higher than ambient pressures. The temperature and pressure treatment is followed by rapid decompression to atmospheric levels. By exposing the contents of the vessel to the atmosphere so that the pressure within the vessel is instantaneously released without cooling the plant material of the spent ground coffee "explodes" due to the higher pressure inside the plant material. The steam explosion results in cellular rupture and pore-size enlargement, which increases the surface area and makes the interior of the cells available for enzymatic action.

While the particle sizes of the ground coffee may be selected within large ranges a small particles size is generally desired to obtain a large surface area. Small particle size in general enhances enzymatic efficiency. Tests have demonstrated that increasingly smaller particle sizes, and micro-pulverization to less than 100 μm, provide increasingly greater yields as substrate pre-treatment for enzymatic hydrolysis.

The ground coffee bean may be milled in two or more stages either by dry or wet milling. Thus, a first milling may occur when preparing the ground coffee bean used for the production of the first extract. A second milling may be performed as a wet-milling of the spent coffee grounds prior to enzymatic hydrolysis. The second wet-milling may occur before or after the steam explosion depending on the circumstances. Wet-milling to a mean particle size of 10 to 250 μm is preferred. The cumulative particle size distribution of the wet-milled spent ground coffee comprises about 90% or more of the particles to be below 150 μm, preferably below 100 μm and in some cases below 50 μm.

In general, any equipment capable of wet-milling to the required particle size range is acceptable and this may include a combination of rotor-stator devices, media mills containing grinding media, cone mills or other shearing devices such as ultrasonic devices and cavitation devices or high pressure homogenisers. Further, for a given equipment type, the performance and resulting coffee particle size can be varied by operating parameters such as rotational speed, throughput rate of coffee, size and shape of media (e.g. in a micro mill) and screen size in a rotor/stator or similar shearing device. A rotor/stator mill, for example Admix Boston Shearmill™ or Ross Model ME-430XS-6 (Charles Ross & Sons, Hauppage N.Y., USA), can be used for the milling step, although other mills, for example colloid mills such as Charlotte SD-2 (Bradman-Lake, Charlotte N.C., USA) or Dispx DRS-2000-5 (IKAUSA), are also suitable.

The separation and also extraction of the first, second, or intermediary extract from the solid components may be performed by any suitable device, including a centrifugal separator, membrane filtration, belt filtration, or percolation. A preferred centrifugal separator is a two phase decanter centrifuge. Suitable decanter centrifuges may be obtained from GEA Westfalia.

The extraction according to step a) may be performed in accordance with a certain process. In this process, the first extract may be produced by providing a mixture of roasted coffee beans and water, milling the mixture of roast coffee beans and water in a pressurized chamber, and separating the milled mixture in a liquid coffee extract and spent coffee grounds.

The submersion of the roasted beans in water during the milling results in a substantial amount of volatile water soluble aroma components being dissolved in the water and appearing in the extract instead of being liberated to the ambient air. In addition, the closed pressurized chamber ensures that the volatile water soluble aroma components do not escape and that the volatile lipophilic components are maintained in the same compartment without escaping to the surroundings.

The use of a pressurised chamber for milling the mixture of roast coffee beans and water also reduces the tendency of foaming. Probably due to the gas from the $CO_2$ release and the protein content in the beans, which is around 10% by weight, the wet grinding process may result in the build-up of foam during milling. The foam formation may result in process stop and subsequent laborious cleaning of the equipment. A higher-than-ambient pressure prevents $CO_2$ bubble release and thus reduces the foam formation.

The $CO_2$ may be stored and used later for pH control of the extraction water.

Furthermore, the combination of the milling and the first extraction in a single process step reduced the complexity of the over-all process. Usually, the roasted coffee beans are milled in one piece of equipment and extracted in another. The combination of the milling and the extraction process in a single step avoids the transport between different locations and the capital investment in separate facilities. In addition, the total process time may be shortened when the mixing of the whole roasted coffee beans and water is performed as an in-line process immediately upstream of the milling process.

Traditional household coffee brewing is performed at a water temperature around the boiling point, i.e. 100° C. In industrial facilities the extraction temperature may be higher to obtain a higher yield. The use of relatively cold water according to the present invention prevents aroma compounds from degrading. Many aroma components tend to react with water or other compounds in the aqueous mixture. The reaction products produce a sensory experience of an uncertain nature.

In some embodiments low-temperature extraction at 80° C. or less, optionally including intermediate steam explosion, in itself results in a surprisingly high yield of up to 50%. Such method may find its use also in household coffee making as well as in semi- and professional coffee brewing (café equipment and automates). The method will result in a ready-to-drink extract made in a device which can handle the required particle size, pressure etc. One such consumer device will offer the user a higher yield and quality relative to common household coffee makers. This will result in less consumption of coffee beans as well as lead to energy savings as the water temperature is 80° C. or less. A derived benefit would be that the consumers reduce the risk of burns.

According to this aspect of the invention a lower temperature of the water is used, such as a temperature at or below 60° C., suitably below 50° C. to obtain a decreased tendency for reaction of the flavour components and a lower vapour pressure of the volatile components. To avoid heating of the water prior to mixing, the temperature may be that of tap water. Alternatively, the water is heated slightly to around room temperature.

The use of low temperature results in a reduced production of furfurals (hereby also 5-HMF) and other decomposition products with an unpleasant taste. While the extraction preferably is performed at temperatures below 80° C., generally the first extraction step is performed at a temperature in the range of 10-80° C. Preferably, the extraction is performed at 15° C. to 45° C., most preferred at room temperature, to prevent that the temperature of the water contributes to the production of decomposition products.

The first extraction generally entails that the milled mixture is maintained in the pressurised chamber for 5 min to 2 hours or more before separation to obtain a sufficient extraction of soluble components. The specific time used for the extraction depends on a number of factors, including the temperature, particle size of the roasted beans, water to bean ratio, water flow rate, concentration gradient etc.

The mixing of the roasted beans and water, and the milling of this mixture may occur in separate compartments and at different pressures. In an aspect of the invention the mixing is performed at ambient pressure, whereas the milling is performed in a pressurised compartment. However, in a preferred embodiment both the mixing of roast coffee and water occurs is a pressurized chamber. The pressure of the mixing chamber and the milling chamber may be different but is suitably at substantially the same level. In an aspect of the invention the pressure during the milling step is 0.5 barg or more, preferably 1 barg or more.

The mixing of the roasted coffee beans and water may occur as an in-line process step immediately prior to the milling of the mixture. The in-line mixing ensures effective handling and short process time.

During the mixing and the milling step of the present invention $CO_2$ is liberated. The liberated $CO_2$ may be vented out of the mixing or the milling chamber. In a certain aspect it is preferred, however, that a major amount of the $CO_2$ liberated from the roast coffee beans during the mixing and/or the milling process steps is maintained together with the mixture of roast coffee and water extract. In a preferred aspect essentially the entire amount of $CO_2$ is maintained in the milling chamber during the milling process. It is believed that this may improve the final result with respect to aroma recovery besides improving the yield.

After the milling procedure, the pressure of the milled mixture is reduced. Suitably, the pressure is reduced to the ambient pressure. By the pressure reduction $CO_2$ and other volatile components may be collected or discharged to surroundings. In a certain embodiment the gas liberated by the reduction of the pressure is passed through a freezing trap to collect volatile components. The reduction of the pressure may be performed prior to, simultaneously with or subsequent to a reduction in temperature, if necessary. The temperature may, if necessary, be reduced to between 0 and 30° C. prior to the separation step.

In some aspects, the first coffee extract is used unmodified in subsequent processes in liquid form or dried. In other aspects the liquid coffee extract is further separated in an aqueous coffee extract and coffee oil.

The first coffee extract may be dried to an instant coffee product, optionally after being blended with other coffee extracts. The drying may occur by conventional spray drying or freeze drying.

EXAMPLES

Example 1

Effect of Surfactant on Extraction

Roast and ground *Robusta* coffee beans (250 g) with a mean particle size of 400 µm were first extracted with hot water (4000 ml total) with a temperature of 60° C. during two cycles to a combined extraction-yield of 31% (±1%). The drained coffee grounds were ground to a mean particle size of 100 µm and loaded into an autoclave together with water (2000 ml). The autoclave was sealed and heated to 130° C. while stirring for 10 minutes to sterilize the grounds. The mixture was then cooled to 50° C. and 10 g GEA cellulase enzyme no. 17 (small samples can be retrieved upon request) was added all at once. The enzymatic hydrolysis was allowed to commence overnight (16 hours) at 65° C. while stirring. The mixture was then heated to 150° C. for 25 minutes, cooled to room temperature, and the spend coffee grounds were drained to yield 2450 g of coffee extract with a dry substance content of 2.94%. The combined yield of all extractions sums to 57%.

Roast and ground *Robusta* coffee beans (250 g) were first extracted with hot water (4000 ml total) during two cycles to a combined yield of 31% (±1%). The drained coffee grounds were ground to a mean particle size of 100 µm and loaded into an autoclave together with water (2000 ml). The autoclave was sealed and heated to 130° C. while stirring for 10 minutes to sterilize the grounds. The mixture was then cooled to 50° C. and 10 g GEA cellulase enzyme no. 17 was added together with the surfactant TWEEN20 (2.0 g). The enzymatic hydrolysis was allowed to commence overnight (16 hours) at 65° C. while stirring. The mixture was then heated to 150° C. for 25 minutes, cooled to room temperature, and the spent coffee grounds were drained to yield 2842 g of coffee extract with a dry substance content of 3.51%. The combined yield of all extractions sums to surprisingly 68% considering the lenient temperatures used.

Example 2

Preparation of Coffee-derived Surfactants

The coffee-derived surfactants were produced with lipase enzymes working on coffee oil and water soluble carbohydrate fragments from coffee. The test-procedure was divided into three phases:

Phase 0: The raw material (200 g of commercial spent *Robusta* coffee grounds) was disintegrated in a blender with demineralized water (500 g) for 10 minutes and filtered. The particle size of the washed and disintegrated grounds was measured to be 50-100 µm.

Phase 1: The disintegrated and washed grounds from phase 0 were suspended in water (360 g) and treated with GEA cellulase enzyme no. 21 (1.0 g) at 50° C. for 14 hours. The suspension was filtered and the content of carbohydrate fragments in the filtrate was measured (1.27%).

Phase 2: To a two-phase mixture of the filtrate from phase 1 (30 g) and coffee oil (2.0 g) obtained from a commercial source was added lipase enzyme (400 mg) of the types listed below and the mixture was agitated by magnetic stirring at 50° C. for 14 hours. The lipid and aqueous layers were allowed to separate, and the latter was removed and filtered.

Different lipase products were separately tested in this procedure:
a) GEA lipase enzyme no. 25
b) Dupont LysoMaxOil (Baking Enzyme)

Each mixture resulting in a filtrate used for further testing in Phase 3.

Phase 3. To each filtrate (14 g) was added spent *Robusta* coffee grounds (7.4 g) prepared as described in Phase 0, and a low dose of commercially available GEA cellulase enzyme no. 21 (25 mg), and the resulting mixtures were stirred at 50° C. for 24 hours. Subsequently, the mixture was heated to 150° C. for 25 min and cooled to room temperature to deactivate the enzyme. A filtrate was recovered and the amount of soluble matter was measured:

| | |
|---|---|
| Reference sample (no lipase) | 9% yield |
| a) GEA lipase enzyme no. 25 | 17% yield |
| b) Dupont LysoMaxOil (Baking Enzyme) | 14% yield |

The examples show that treating coffee oil with lipase enzyme in presence of coffee carbohydrate fragments result in substances that have a positive effect on the yield of soluble matter in subsequent cellulase hydrolysis of spend coffee grounds.

Example 3

The following example shows how a relatively high extraction yield can be obtained at relatively low temperature Roasted coffee beans (400 g, TS 95.05%, 380 g dry weight) were ground on a commercially available coffee grinder to a mean particle size of 400 µm. The roast and grounds were then transferred to a container together with 1000 mL water (25° C.). The slurry was thoroughly mixed, and after two min, the slurry was transferred to an extraction column, fitted with a 300 µm filter in one end. Soluble solids were extracted from the beans by pumping water (25° C.) through the column, until Brix of the effluent was 0.5. The collected volume was 2777 mL and the amount of dissolved solids was 3.56%, corresponding to a yield of 98.86 g or 26%.

The coffee grounds were then removed from the column and transferred together with water (2000 mL) to a vessel capable of sustaining high pressure and high temperature. The bottom valve of the vessel was fitted with metal tubing connected to a cyclone so that high pressure within the vessel can be released into the cyclone. The container was sealed, and the temperature was raised to 140° C. while the slurry was stirred. After 60 min at 140° C., the bottom valve was opened to allow the slurry to escape into the cyclone. The sudden drop in pressure causes a steam explosion that disrupts the cells in the coffee grounds and seems to improve the yield.

The coffee grounds were then extracted with water (65° C.) until Brix of the effluent was 0.1. The collected volume of extract at this step was 5283 mL and the amount of dissolved solids was 1.33%, corresponding to 70.3 g. The total extraction yield of the two combined extraction steps is 169 g or 44%.

The coffee grounds were further washed with water (65° C.) until Brix of the washing water was 0. This washing water contains virtually no yield, and was therefore discarded. The coffee grounds were finely divided in a kitchen grade blending machine to a mean particle size of 50 µm and transferred together with 2000 mL of water to a heated container. A mix of enzymes was added all at once: GEA hydrolysing enzyme no. 42 (4.00 g). The slurry was then kept at 50° C. while stirring for 18 hours and was then centrifuged.

The above sums to a total of three extracts with the yields described in the table below.

| Extract # | Weight of extract | TS % in extract | Extracted solids | Accumulated yield (gram) | Accumulated yield % |
|---|---|---|---|---|---|
| Extract 1 | 2777 g | 3.56 | 98.9 g | 98.9 g | 26% |
| Extract 2 | 5283 g | 1.33 | 70.3 g | 169 g | 45% |
| Extract 3 | 3971 g | 2.04 | 77.2 g[1)] | 246 g | 65% |

[1)]Note that the 4.0 g of added enzyme has been subtracted from the extracted solids.

The total yield of 65% is surprisingly high considering the low temperatures used.

Example 4

A batch of 250 g roast *Robusta* coffee beans with a solid content of 240 g (96%) was mill ground to a mean particle size of 400 µm and stirred in 750 g of deionised water at ambient temperature for 60 min.

The mixture was filtered through a Büchner funnel, and the filter cake was washed with 500 g of deionised water. After evaporation of the combined filtrates, the content of total solids were approximately 48 g corresponding to 20% of the initial batch.

The washed filter cake was suspended in 1000 g of deionised water and transferred to a pressure chamber. With internal mechanical stirring, the mixture was heated to 140° C. for 90 min, and steam exploded into a cyclone.

The mixture was filtered through a Büchner funnel, and the filter cake was washed with 1000 g of deionised water. After evaporation of the combined filtrates, the content of total solids was approximately 48 g corresponding to another 20% of the initial batch—resulting in 40% accumulated yield.

The residual 60% in the filter cake was transferred to a beaker and deionised water was added to a total volume of 1400 ml. This mixture was homogenized on a Turrax T 18

High Shear Mixer for 60 min to a mean particle size below 100 μm and a dry solid content of 16%.

A 50 g sample of this mixture (8 g of total solids) was subjected to enzyme treatment. Based on the dry solids in this sample a 1.9% total dosage of GEA hydrolysing enzyme no. 42 (small samples can be retrieved upon request) was used over three steps.

Step 1:

The sample was agitated with 45 g of deionised water for 1 min and centrifuged at 4500 rpm for 4 min. The supernatant was removed, and the procedure was repeated to remove more soluble substances and fine particles. The combined supernatants were evaporated to give 688 mg dry solids (8.5% of the 50 g sample).

The washed sample was suspended in 50 g of deionised water, and to this mixture was added a load of 0.42% GEA hydrolysing enzyme no. 42 (32 mg). The mixture was sealed and stirred at 50° C. for 12 hours and centrifuged at 4500 rpm for 4 min. The supernatant was removed and the residue was agitated with 40 g of deionised water for 1 min and centrifuged at 4500 rpm for 4 min. The wash was repeated with an additional 40 g of deionised water to remove more solubilized substances and fine particles formed by the enzymes. The combined supernatants were evaporated to give 1.84 g solids (23% of the solids in the 50 g sample).

Step 2:

The residue from step 1 was suspended in 50 g of deionised water, and to this mixture was added a load of 0.58% GEA hydrolysing enzyme no. 42 (46 mg). The mixture was sealed and stirred at 50° C. for 12 hours and centrifuged at 4500 rpm for 4 min. The supernatant was removed and the residue was agitated with 40 g of deionised water for 1 min and centrifuged at 4500 rpm for 4 min. The wash was repeated with an additional 40 g of deionised water to remove more solubilized substances and fine particles formed by the enzymes. The combined supernatants were evaporated to give 1.44 g solids (18% of the solids in the 50 g sample).

Step 3:

The residue from step 2 was suspended in 50 g of deionised water, and to this mixture was added a load of 0.90% GEA hydrolysing enzyme no. 42 (72 mg). The mixture was sealed and stirred at 50° C. for 12 hours and centrifuged at 4500 rpm for 4 min. The supernatant was removed and the residue was agitated with 40 g of deionised water for 1 minute and centrifuged at 4500 rpm for 4 min. The wash was repeated with an additional 40 g of deionised water to remove more solubilized substances and fine particles formed by the enzymes. The combined supernatants were evaporated to give 1.44 g solids (18% of the solids in the 50 g sample).

The combined yield of the 50 g sample was 67.5% over three steps, corresponding to 40.5% of the initial roast coffee beans and affording a total yield of surprisingly 80.5%.

Example 5

A batch of 250 roast and ground *Robusta* coffee beans was extracted, steam exploded and prepared for enzyme treatment according to the procedure described in example 4, affording soluble fragments in a total yield of 46.5%.

Of the remaining insoluble material, 20.12 g (2.37 g dry weight) was transferred to a 50 ml Millipore Amicon membrane filtration cell fitted with an Alfa Laval UFX 10 pHt 10 kDa ultrafiltration membrane. The cell was further charged with a mixture of GEA hydrolysing enzyme no. 42 (17 mg), and sodium citrate buffer solution (pH 4.50, 25 mM, 45 g).

A feed tank containing excess sodium citrate buffer solution (pH 4.50, 25 mM) was connected to the filtration cell. The mixture in the cell was stirred and heated to 50° C., and a pressure of 1 barg was applied to the feed tank, forcing buffer solution to flow continuously from the feed tank to the cell and pass the membrane with soluble fragments formed by the enzymes. Over a period of 12 hours, a total of 855 g permeate was collected as a clear solution, of which 63 g was transferred to a second Millipore Amicon membrane filtration cell fitted with a DOW FILMTEC NF-270 300 kDa nanofiltration membrane. The solution was stirred and a pressure of 4 barg was applied, forcing the dissolved sodium citrate to pass the membrane but retaining the soluble fragments formed by the enzymes.

The total solubilised solids obtained from the retentate and by washing the residual coffee grounds was 1.2 g-50.5% of the material transferred to the cell.

This corresponds to a total yield of 73.5% based on the dry solids in the roast and ground coffee and furthermore reduces the enzyme dosage from 1.9% to 0.5% compared to example 4. This yield was quite surprising considering the very small enzyme dosage used.

The invention claimed is:

1. A process for production of an instant coffee product in an improved yield, comprising:
    extracting roast and ground coffee beans with water having a temperature of 80° C. or less, to produce a first extract and spent coffee grounds;
    pre-treating the spent coffee grounds, wherein the pre-treating comprises adding water to the spent coffee grounds, steam exploding the spent coffee grounds, and separating into an intermediate extract and pre-treated spent coffee grounds, and wherein the steam exploding is performed in a temperature range of 50-170° C., at a pressure of 0.1 to 10 bar for 0.1 to 5 hours;
    adding water to the pre-treated spent coffee grounds to produce an aqueous suspension;
    hydrolysing the aqueous suspension using a hydrolysing enzyme to produce a second extract and spent remains;
    adding the first extract and the intermediate extract to the second extract, after concentration or drying of the intermediate or the second extract, to obtain a combined extract; and
    drying the combined extract to obtain the instant coffee product.

2. The process according to claim 1, wherein the extracting is performed at a temperature in the range of 10-80° C.

3. The process according to claim 1, wherein the extracting is performed in a time range of 5 min to 2 hours.

4. The process according to claim 1, wherein the hydrolysing enzyme is selected among carbohydrate hydrolysing enzymes or carboxylic ester hydrolysing enzymes or any combination of the carbohydrate hydrolysing enzymes and the carboxylic ester hydrolysing enzymes.

5. The process according to claim 4, wherein the hydrolysis is performed on one or more of the aqueous suspension of spent coffee grounds at a temperature in the range of 40-80° C., the aqueous suspension of spent coffee grounds at pH 4-7, or the aqueous suspension of spent coffee grounds in a time range of 1-16 hours.

6. The process according to claim 1, wherein an auxiliary agent is present during the hydrolysis.

7. The process according to claim 6, wherein the auxiliary agent is a coffee-derived surfactant.

8. The process according to claim 7, wherein the coffee-derived surfactant is obtainable by:

digesting spent coffee grounds with a carbohydrate hydrolysing enzyme to obtain carbohydrate fragments, and adding to the carbohydrate fragments a coffee oil and a carboxylic ester hydrolysing enzyme at conditions allowing for transesterification.

9. The process according to claim 8, wherein the carbohydrate hydrolysing enzyme is selected from a group comprising cellulase, xylanase, hemicellulase, or any combination thereof.

10. The process according to claim 8, wherein the carboxylic ester hydrolysing enzyme is selected from the group consisting of esterase, lipase, or any combination thereof.

11. The process according to claim 8, wherein the coffee oil is derived from green coffee beans, roast and ground coffee, or spent coffee grounds extracts.

12. The process according to claim 7, wherein the coffee-derived surfactant is obtained in-situ during the hydrolysis by an addition of a carboxylic ester hydrolysing enzyme and a coffee oil to the aqueous suspension.

13. The process according to claim 1, wherein the pretreatment comprises a temperature regimen comprising:
a low temperature treatment period in the temperature range of 25 to 150° C. for 1 min to 24 hours.

14. The process according to claim 1, wherein the pretreated spent coffee grounds are subjected to a washing process prior to enzymatic hydrolysis.

15. The process according to claim 1, wherein, after the hydrolysis, the second extract is post-treated by one or more of:
heating the second extract to a temperature above 70° C. in a time sufficient to inactivate the hydrolysing enzyme; or
membrane filtering to remove the hydrolysing enzyme.

16. The process according to claim 15, further comprising heating the second extract to a temperature of approximately 120° C. for 10-30 minutes.

17. The process according to claim 15, wherein the removed hydrolysing enzyme is re-used in hydrolysis of another aqueous suspension.

18. The process according to claim 1, wherein the spent coffee grounds are finely divided into an average particle size in a range of 2-1000 prior to the hydrolysis of the aqueous suspension using the hydrolysing enzyme.

19. The process according to claim 1, wherein a yield of total solids in the instant coffee product, based on an amount of the roast and ground coffee beans, is 65% by weight or more.

20. The process according to claim 1, wherein a yield of total solids in the instant coffee product, based on amount of roasted and grounded coffee beans, is 70% by weight or more.

21. The process according to claim 1, wherein a yield of total solids in the instant coffee product, based on amount of roasted and grounded coffee beans, is 75% by weight or more.

22. The process according to claim 1, further comprising membrane filtering a third extract for recycling an aqueous permeate for reuse in the process.

23. The process according to claim 1, further comprising concentrating the first extract such that an aroma is preserved.

24. The process according to claim 23, wherein the concentrating of the first extract is freeze concentrating.

25. The process according to claim 1, wherein the coffee beans before extraction are divided into a mean particle size in a range of 0.2-5 mm.

26. The process according to claim 25, wherein the mean particle size is in a range of 0.2-0.5 mm.

27. The process according to claim 1, wherein the pretreatment comprises a temperature regimen comprising a high temperature treatment period in the temperature range of 100 to 200° C. for 1 min to 24 hours.

* * * * *